US012546255B2

(12) United States Patent
Lingaiah et al.

(10) Patent No.: US 12,546,255 B2
(45) Date of Patent: Feb. 10, 2026

(54) SENSOR ASSEMBLY TO DETECT PROPELLER WHIRL IN A TURBINE ENGINE

(71) Applicant: General Electric Company, Schenectady, NY (US)

(72) Inventors: Puneeth Lingaiah, Bengaluru (IN); Dinesh Rakwal, Bengaluru (IN); Ravindra Shankar Ganiger, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 174 days.

(21) Appl. No.: 18/517,224

(22) Filed: Nov. 22, 2023

(65) Prior Publication Data

US 2025/0215825 A1 Jul. 3, 2025

(30) Foreign Application Priority Data

Jul. 31, 2023 (IN) .............................. 202311051299

(51) Int. Cl.
*F02C 7/057* (2006.01)
*F04D 27/00* (2006.01)

(52) U.S. Cl.
CPC ............ *F02C 7/057* (2013.01); *F04D 27/001* (2013.01); *F04D 27/002* (2013.01); *F05D 2220/36* (2013.01); *F05D 2260/70* (2013.01)

(58) Field of Classification Search
CPC .. F01D 7/00; F01D 7/02; B64C 11/30–11/44; B64C 27/57; F04D 27/001; F04D 27/002; F05D 2260/70
See application file for complete search history.

(56) References Cited

U.S. PATENT DOCUMENTS

| 5,174,718 | A | * | 12/1992 | Lampeter | B64C 11/38 |
| | | | | | 416/157 R |
| 6,250,166 | B1 | | 6/2001 | Dingwell et al. | |
| 6,745,622 | B2 | | 6/2004 | Smith et al. | |
| 7,162,373 | B1 | | 1/2007 | Kadioglu et al. | |
| 7,711,664 | B2 | | 5/2010 | Saito et al. | |
| 10,336,436 | B2 | * | 7/2019 | Siu | B64C 27/10 |

(Continued)

FOREIGN PATENT DOCUMENTS

| CN | 113959722 A | 1/2022 |
| FR | 3124262 A1 | 12/2022 |

*Primary Examiner* — Sang K Kim
(74) *Attorney, Agent, or Firm* — Venable LLP; Peter T. Hrubiec; Michele V. Frank

(57) ABSTRACT

A turbine engine includes a plurality of fan blades configured to rotate about a longitudinal centerline axis of the turbine engine, a pitch actuator configured to control a pitch angle of each of the plurality of fan blades, a sensor assembly configured to detect a holding torque of the plurality of fan blades, and a controller configured to monitor propeller whirl in the plurality of fan blades by detecting the holding torque. The sensor assembly includes a first sensor coupled to the pitch actuator and configured to detect the holding torque of all of the plurality of fan blades and a second sensor coupled to the pitch actuator and configured to detect the holding torque of at least one fan blade of the plurality of fan blades. The pitch actuator is configured to take a corrective action when propeller whirl is detected outside of a predetermined limit.

20 Claims, 6 Drawing Sheets

(56) References Cited

U.S. PATENT DOCUMENTS

| | | | |
|---|---|---|---|
| 10,359,473 B2 | 7/2019 | Qiao et al. | |
| 10,908,050 B2 | 2/2021 | Schleif et al. | |
| 11,519,346 B2 * | 12/2022 | Cervelli | F02C 9/58 |
| 11,834,196 B2 * | 12/2023 | Adibhatla | F02C 6/206 |
| 2022/0026310 A1 | 1/2022 | Shiomi et al. | |

* cited by examiner

SENSOR ASSEMBLY TO DETECT PROPELLER WHIRL IN A TURBINE ENGINE

CROSS REFERENCE TO RELATED APPLICATIONS

The present application claims the benefit of Indian Patent Application number 202311051299, filed on Jul. 31, 2023, which is hereby incorporated by reference herein in its entirety.

TECHNICAL FIELD

The present disclosure relates generally to a system to detect propeller whirl in a turbine engine.

BACKGROUND

A turbine engine generally includes a fan and a core section arranged in flow communication with one another.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
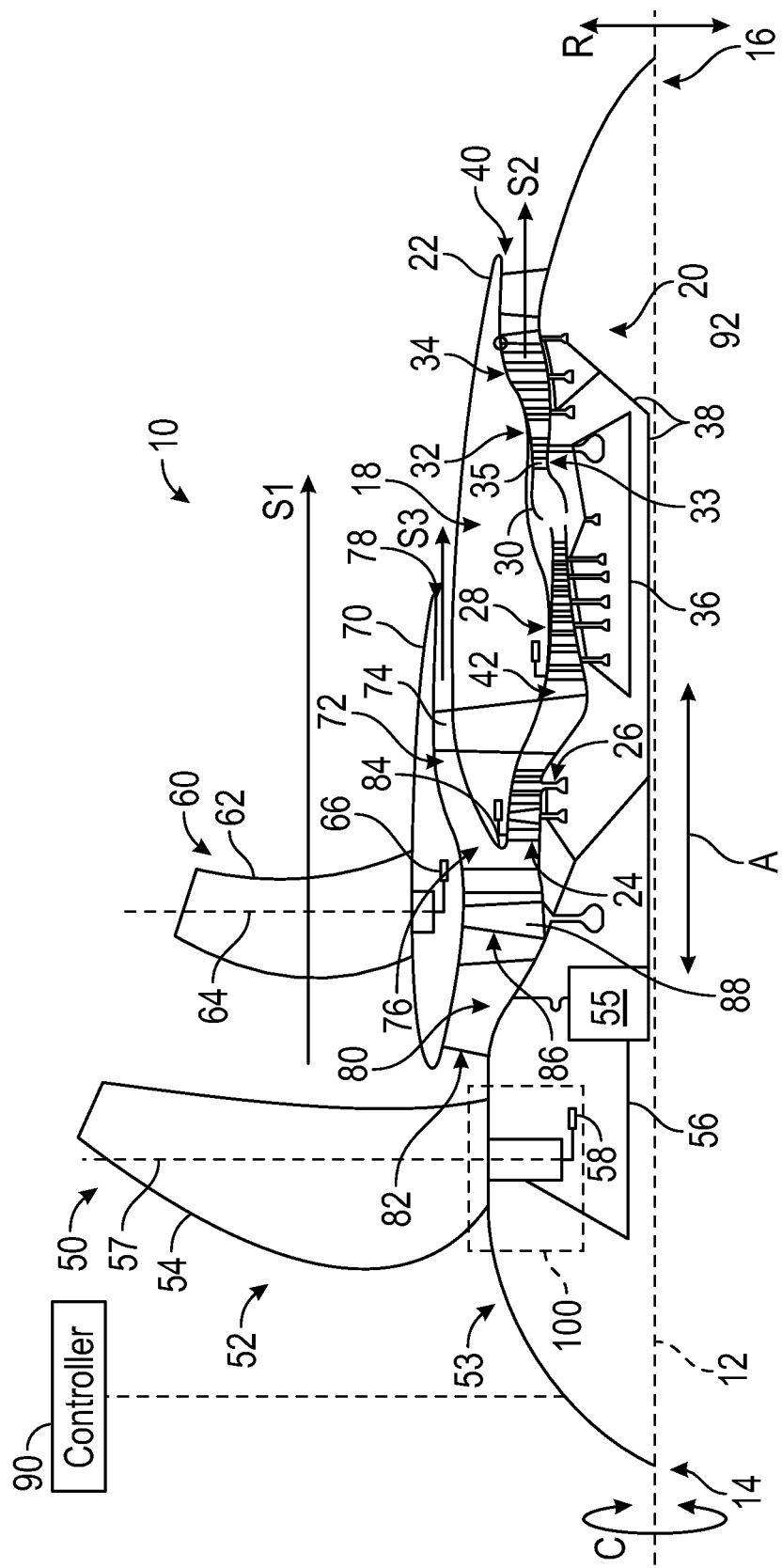
FIG. 1 illustrates a schematic view of an unducted, three-stream gas turbine engine, taken along a longitudinal centerline axis of the engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," etc. may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure describes a system for and a method of detecting whirl in fan blades of an engine, such as the gas turbine engine described with respect to FIG. 1. The whirl is also referred to herein as prop whirl, propeller whirl, whirl mode, prop whirl mode, and propeller whirl mode. During operation of an engine, as will be described in more detail to follow, fan blades may experience propeller whirl that may cause the fan blades to rotate off-center from the central axis of the engine, changing the angle of attack of the fan blade, or both. Such alternation of the operation of the fan blades affects the performance of the engine. The present disclosure provides a system of sensors that measures a holding torque on the fan blades to detect the whirl in the fan blades. The sensors may include one or more accelerometers, one or more load cells, one or more strain gauges, one or more pressure sensors, one or more conductance bands, or any combination thereof. The present disclosure provides a method of using the sensor data to detect whirl of the fan blades.

FIG. 1 shows a schematic view of an unducted, three-stream, gas turbine engine 10 for an aircraft that may incorporate one or more embodiments of the present disclosure. The gas turbine engine 10 of FIG. 1 is a "three-stream engine" in that its architecture provides three distinct streams (labeled S1, S2, and S3) of thrust-producing airflow during operation, as detailed further below. Aspects of the present disclosure may be incorporated into any other suitable turbine engine, including, but not limited to, turbofan engines, propfan engines, turbojet engines, turboprop, and turboshaft engines, aviation-based turbine engines, marine-based turbine engines, land-based turbine engines, industrial turbine engines, power generation turbine engines, etc.

As shown in FIG. 1, the gas turbine engine 10 defines an axial direction A, a radial direction R, and a circumferential direction C. Moreover, the gas turbine engine 10 defines a longitudinal centerline axis 12 that extends along the axial direction A. In general, the axial direction A extends parallel to the longitudinal centerline axis 12, the radial direction R extends outward from, and inward to, the longitudinal centerline axis 12 in a direction orthogonal to the axial direction A, and the circumferential direction C extends three hundred sixty degrees (360°) around the longitudinal centerline axis 12. The gas turbine engine 10 extends between a forward end 14 and an aft end 16, e.g., along the axial direction A.

The gas turbine engine 10 includes a core engine 20 and a fan assembly 50 positioned upstream thereof. Generally, the core engine 20 includes, in serial flow order, a compressor section, a combustion section, a turbine section, and an exhaust section. Particularly, as shown in FIG. 1, the core engine 20 includes an engine core 18 and a core cowl 22 that annularly surrounds the core engine 20. The engine core 18 includes a high-pressure (HP) compressor 28, a combustor 30, and a high-pressure (HP) turbine 32. The core engine 20 and the core cowl 22 define a core inlet 24 having an annular shape. The core cowl 22 further encloses and supports a low-pressure (LP) compressor 26 (also referred to as a booster) for pressurizing the air that enters the core engine 20 through core inlet 24. The HP compressor 28 receives pressurized air from the LP compressor 26 and further increases the pressure of the air. The pressurized air flows downstream to the combustor 30 where fuel is injected into the pressurized air and ignited to raise the temperature and the energy level of the pressurized air, thereby generating combustion gases.

The combustion gases flow from the combustor 30 downstream to the HP turbine 32. The HP turbine 32 drives the HP compressor 28 through a first shaft, also referred to as a high-pressure (HP) shaft 36 (also referred to as a high-speed shaft). In this regard, the HP turbine 32 is drivingly coupled with the HP compressor 28. The combustion gases then flow to a power turbine or a low-pressure (LP) turbine 34. The LP turbine 34 drives the LP compressor 26 and components of the fan assembly 50 through a second shaft, also referred to as a low-pressure (LP) shaft 38 (also referred to as a low-speed shaft). In this regard, the LP turbine 34 is drivingly coupled with the LP compressor 26 and components of the fan assembly 50. The low-speed shaft 38 is coaxial with the high-speed shaft 36 in the embodiment of FIG. 1. After driving each of the HP turbine 32 and the LP turbine 34, the combustion gases exit the engine core 18 through a core exhaust nozzle 40. The core engine 20 defines a core flowpath, also referred to as a core duct 42, that extends between the core inlet 24 and the core exhaust nozzle 40. The core duct 42 is an annular duct positioned generally inward of the core cowl 22 along the radial direction R.

The fan assembly 50 includes a primary fan 52. In the embodiment of FIG. 1, the primary fan 52 is an open rotor fan, also referred to as an unducted fan. However, in other embodiments, the primary fan 52 may be ducted, e.g., by a fan casing or a nacelle circumferentially surrounding the primary fan 52. The primary fan 52 includes an array of fan blades 54 (only one shown in FIG. 1). The fan blades 54 are rotatably coupled to a hub 53 for rotation about the longitudinal centerline axis 12 via a fan shaft 56. As shown in FIG. 1, the fan shaft 56 is coupled with the low-speed shaft 38 via a speed reduction gearbox, also referred to as a gearbox assembly 55, e.g., in an indirect-drive configuration. The gearbox assembly 55 is shown schematically in FIG. 1. The gearbox assembly 55 includes a plurality of gears for adjusting the rotational speed of the fan shaft 56 and, thus, the primary fan 52 relative to the low-speed shaft 38 to a more efficient rotational fan speed. The fan gearbox assembly may have a gear ratio of 4:1 to 12:1, or 7:1 to 12:1, or 4:1 to 10:1, or 5:1 to 9:1, or 6:1 to 9:1, and may be configured in an epicyclic star or a planet gear configuration. The gearbox may be a single stage or a compound gearbox.

The fan blades 54 can be arranged in equal spacing around the longitudinal centerline axis 12. Each fan blade 54 has a root and a tip, and a span defined therebetween. Each fan blade 54 defines a central blade axis 57. For the embodiment of FIG. 1, each fan blade 54 of the primary fan 52 is rotatable about its respective central blade axis 57, e.g., in unison with one another. One or more actuators 58 are controlled to pitch the fan blades 54 about their respective central blade axis 57. The pitch of the fan blades 54 is controlled based on a desired aerodynamic or engine performance. That is, the one or more actuators 58 control the pitch of the fan blades 54 based on the engine operating conditions and may be controlled to change pitch to achieve a predetermined engine performance. For example, as described herein, the fan blades 54 are controlled to change the aerodynamic forces acting on the fan blades 54 and mitigate or prevent propeller whirl acting thereon. In other embodiments, each fan blade 54 is fixed or is unable to be pitched about the central blade axis 57.

The fan assembly 50 further includes a fan guide vane array 60 that includes fan guide vanes 62 (only one shown in FIG. 1) disposed around the longitudinal centerline axis 12. For the embodiment of FIG. 1, the fan guide vanes 62 are not rotatable about the longitudinal centerline axis 12. Each fan guide vane 62 has a root and a tip, and a span defined therebetween.

The fan guide vanes 62 can be unshrouded as shown in FIG. 1 or can be shrouded, e.g., by an annular shroud spaced outward from the tips of the fan guide vanes 62 along the radial direction R. Each fan guide vane 62 defines a central vane axis 64. For the embodiment of FIG. 1, each fan guide vane 62 of the fan guide vane array 60 is rotatable about their respective central vane axis 64, e.g., in unison with one another. One or more actuators 66 are controlled to pitch the fan guide vanes 62 about its respective central vane axis 64. In other embodiments, each fan guide vane 62 is fixed or is unable to be pitched about the central vane axis 64. The fan guide vanes 62 are mounted to a fan cowl 70.

The fan cowl 70 annularly encases at least a portion of the core cowl 22 and is generally positioned outward of the core cowl 22 along the radial direction R. Particularly, a downstream section of the fan cowl 70 extends over a forward portion of the core cowl 22 to define a fan flowpath, also referred to as a fan duct 72. Incoming air enters through the fan duct 72 through a fan duct inlet 76 and exits through a fan exhaust nozzle 78 to produce propulsive thrust. The fan duct 72 is an annular duct positioned generally outward of the core duct 42 along the radial direction R. The fan cowl 70 and the core cowl 22 are connected together and supported by a plurality of struts 74 (only one shown in FIG. 1) that extend substantially radially and are circumferentially spaced about the longitudinal centerline axis 12. The plurality of struts 74 are each aerodynamically contoured to direct air flowing thereby. Other struts in addition to the plurality of struts 74 can be used to connect and to support the fan cowl 70 and/or the core cowl 22.

The gas turbine engine 10 also defines or includes an inlet duct 80. The inlet duct 80 extends between an engine inlet 82 and the core inlet 24 and the fan duct inlet 76. The engine inlet 82 is defined generally at the forward end of the fan cowl 70 and is positioned between the primary fan 52 and the fan guide vane array 60 along the axial direction A. The inlet duct 80 is an annular duct that is positioned inward of the fan cowl 70 along the radial direction R. Air flowing downstream along the inlet duct 80 is split, not necessarily evenly, into the core duct 42 and the fan duct 72 by a splitter 84 of the core cowl 22. The inlet duct 80 is wider than the core duct 42 along the radial direction R. The inlet duct 80 is also wider than the fan duct 72 along the radial direction R.

The fan assembly 50 also includes a mid-fan 86. The mid-fan 86 includes a plurality of mid-fan blades 88 (only one shown in FIG. 1). The plurality of mid-fan blades 88 are rotatable, e.g., about the longitudinal centerline axis 12. The mid-fan 86 is drivingly coupled with the LP turbine 34 via the low-speed shaft 38. The plurality of mid-fan blades 88 can be arranged in equal circumferential spacing about the longitudinal centerline axis 12. The plurality of mid-fan blades 88 are annularly surrounded (e.g., ducted) by the fan cowl 70. In this regard, the mid-fan 86 is positioned inward of the fan cowl 70 along the radial direction R. The mid-fan 86 is positioned within the inlet duct 80 upstream of both the core duct 42 and the fan duct 72. In some instances, a ratio of a span of a fan blade 54 to that of a mid-fan blade 88 (a span is measured from a root to tip of the respective blade) is greater than two and less than ten, to achieve the desired benefits of the third stream S3, particularly, the additional thrust the ratio offers to the gas turbine engine 10, which may enable a smaller diameter fan blade 54, which, in turn, can benefit engine installation.

Accordingly, air flowing through the inlet duct 80 flows across the plurality of mid-fan blades 88 and is accelerated downstream thereof. At least a portion of the air accelerated by the mid-fan blades 88 flows into the fan duct 72 and is ultimately exhausted through the fan exhaust nozzle 78 to produce propulsive thrust. Also, at least a portion of the air accelerated by the plurality of mid-fan blades 88 flows into the core duct 42 and is ultimately exhausted through the core exhaust nozzle 40 to produce propulsive thrust. Generally, the mid-fan 86 is a compression device positioned downstream of the engine inlet 82. The mid-fan 86 is operable to accelerate air into the fan duct 72, also referred to as a secondary bypass passage.

During operation of the gas turbine engine 10, an initial or incoming airflow passes through the fan blades 54 of the primary fan 52 and splits into a first airflow and a second airflow. The first airflow bypasses the engine inlet 82 and flows generally along the axial direction A outward of the fan cowl 70 along the radial direction R. The first airflow accelerated by the fan blades 54 passes through the fan guide vanes 62 and continues downstream thereafter to produce a primary propulsion stream or first thrust stream S1. A majority of the net thrust produced by the gas turbine engine 10 is produced by the first thrust stream S1. The second airflow enters the inlet duct 80 through the engine inlet 82.

The second airflow flowing downstream through the inlet duct 80 flows through the plurality of mid-fan blades 88 of the mid-fan 86 and is consequently compressed. The second airflow flowing downstream of the mid-fan blades 88 is split by the splitter 84 located at the forward end of the core cowl 22. Particularly, a portion of the second airflow flowing downstream of the mid-fan 86 flows into the core duct 42 through the core inlet 24. The portion of the second airflow that flows into the core duct 42 is progressively compressed by the LP compressor 26 and the HP compressor 28, and is ultimately discharged into the combustion section. The discharged pressurized air stream flows downstream to the combustor 30 where fuel is introduced to generate combustion gases or products.

The combustor 30 defines an annular combustion chamber that is generally coaxial with the longitudinal centerline axis 12. The combustor 30 receives pressurized air from the HP compressor 28 via a pressure compressor discharge outlet. A portion of the pressurized air flows into a mixer. Fuel is injected by a fuel nozzle (omitted for clarity) to mix with the pressurized air, thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle of the HP turbine 32. The first stage turbine nozzle 33 is defined by an annular flow channel that includes a plurality of radially extending, circumferentially spaced nozzle vanes 35 that turn the combustion gases so that the combustion gases flow angularly and impinge upon first stage turbine blades of the HP turbine 32. The combustion gases exit the HP turbine 32 and flow through the LP turbine 34, and exit the core duct 42 through the core exhaust nozzle 40 to produce a core air stream, also referred to as a second thrust stream S2. As noted above, the HP turbine 32 drives the HP compressor 28 via the high-speed shaft 36, and the LP turbine 34 drives the LP compressor 26, the primary fan 52, and the mid-fan 86, via the low-speed shaft 38.

The other portion of the second airflow flowing downstream of the mid-fan 86 is split by the splitter 84 into the fan duct 72. The air enters the fan duct 72 through the fan duct inlet 76. The air flows generally along the axial direction A through the fan duct 72 and is ultimately exhausted from the fan duct 72 through the fan exhaust nozzle 78 to produce a third stream, also referred to as the third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and thereby a percent contribution to total thrust, are passively adjusted during engine operation or can be modified purposefully through use of engine control features (such as fuel flow, electric machine power, variable stators, variable inlet guide vanes, valves, variable exhaust geometry, or fluidic features) to adjust or to improve overall system performance across a broad range of potential operating conditions.

The gas turbine engine 10 depicted in FIG. 1 is by way of example only. In other embodiments, the gas turbine engine 10 may have any other suitable configuration. For example, in other embodiments, the primary fan 52 may be configured in any other suitable manner (e.g., as a fixed pitch fan) and further may be supported using any other suitable fan frame configuration. In other embodiments, the primary fan 52 can be ducted by a fan casing or a nacelle such that a bypass passage is defined between the fan casing and the fan cowl 70. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turbojet engines, turboprop, turboshaft engines, and/or turbine engines defining two streams (e.g., a bypass stream and a core air stream).

A controller 90 is in communication with the turbine engine 10 for controlling aspects of the turbine engine 10. For example, the controller 90 is in two-way communication with the turbine engine 10 for receiving signals from various sensors and control systems of the turbine engine 10 and for controlling components of the turbine engine 10, as detailed further below. The controller 90, or components thereof, may be located onboard the turbine engine 10, onboard the aircraft, or may be located remote from each of the turbine engine 10 and the aircraft. The controller 90 can be a Full Authority Digital Engine Control (FADEC) that controls aspects of the turbine engine 10.

The controller 90 may be a standalone controller or may be part of an engine controller to operate various systems of the turbine engine 10. In this embodiment, the controller 90 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 90 to perform operations. The controller 90 and, more specifically, the one or more processors are programmed or configured to perform these operations, such as the operations discussed further below. In some embodiments, the instructions can be executed by the one or more processors to cause the one or more processors to complete any of the operations and functions for which the controller 90 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 2:
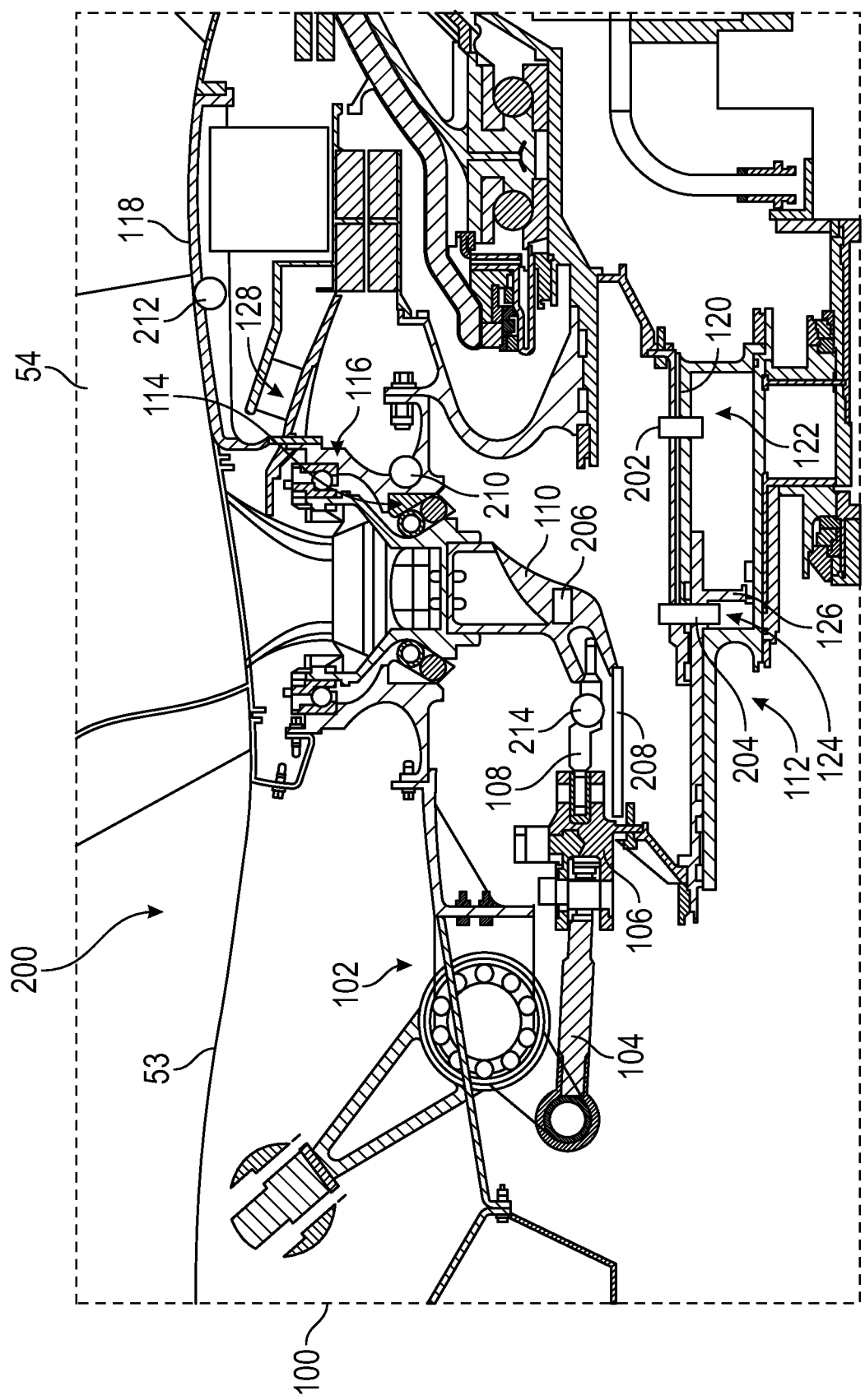
FIG. 2 illustrates an enlarged cross-sectional view of a portion of the gas turbine engine of FIG. 1, according to the present disclosure.

FIG. 2 illustrates an enlarged portion 100 of FIG. 1. As described with respect to FIG. 1, the fan blades 54 (only one illustrated) are rotatably coupled to the hub 53. A plurality of the fan blades 54 may be spaced circumferentially about the hub 53 and about the longitudinal centerline axis 12. Thus, although one fan blade 54 is illustrated, more may be provided. The fan blades 54 are coupled to the fan shaft 56 (FIG. 1) with an actuator 102, which may be the actuator 58 of FIG. 1. The actuator 102 may control the pitch angle of the fan blades 54 with respect to the longitudinal centerline axis 12 (FIG. 1). The controller 90 (FIG. 1) may control the actuator 102, thus controlling the pitch angle of the fan blades 54. The actuator 102, also referred to herein as a pitch actuator 102, may control a feather position and a coarse position of the fan blades 54. The actuator 102 includes a plurality of links to couple a blade pitching lever 110 of each fan blade 54 to a rotating linear actuator 112. The plurality of links may include a first link 104, a second link 106, and a third link 108. The blade pitching lever 110 includes a bearing assembly 114 to allow relative movement of the fan blade 54 with respect to static mounting members, such as, for example, first static mounting member 116 and second static mounting member 118.

The rotating linear actuator 112 is coupled to the plurality of links and includes a hydraulic cylinder 120 that defines a first chamber 122 and a second chamber 124. The first chamber 122 is separated from the second chamber 124 with a wall 126. During operation of the actuator 102, pressure may be supplied to or removed from the first chamber 122, the second chamber 124, or both the first chamber 122 and the second chamber 124, to control the angle of the fan blade 54. A blade angle sensor 128 may be provided to measure the angle of the fan blade 54 with respect to the longitudinal centerline axis 12 (FIG. 1). Control of the fan blade 54 with the rotating linear actuator 112 is well known and a person of ordinary skill in the art will understand that pressure applied to the first chamber 122 (and/or removed from the second chamber 124) causes the first link 104, the second link 106, and the third link 108 to move axially in a first axial direction to cause the fan blade 54 to rotate in a first rotational direction. Likewise, pressure applied to the second chamber 124 (and/or removed from the first chamber 122) causes the first link 104, the second link 106, and the third link 108 to move axially in a second axial direction (opposite the first axial direction) to cause the fan blade 54 to rotate in a second rotational direction opposite the first rotational direction.

Figure 3:
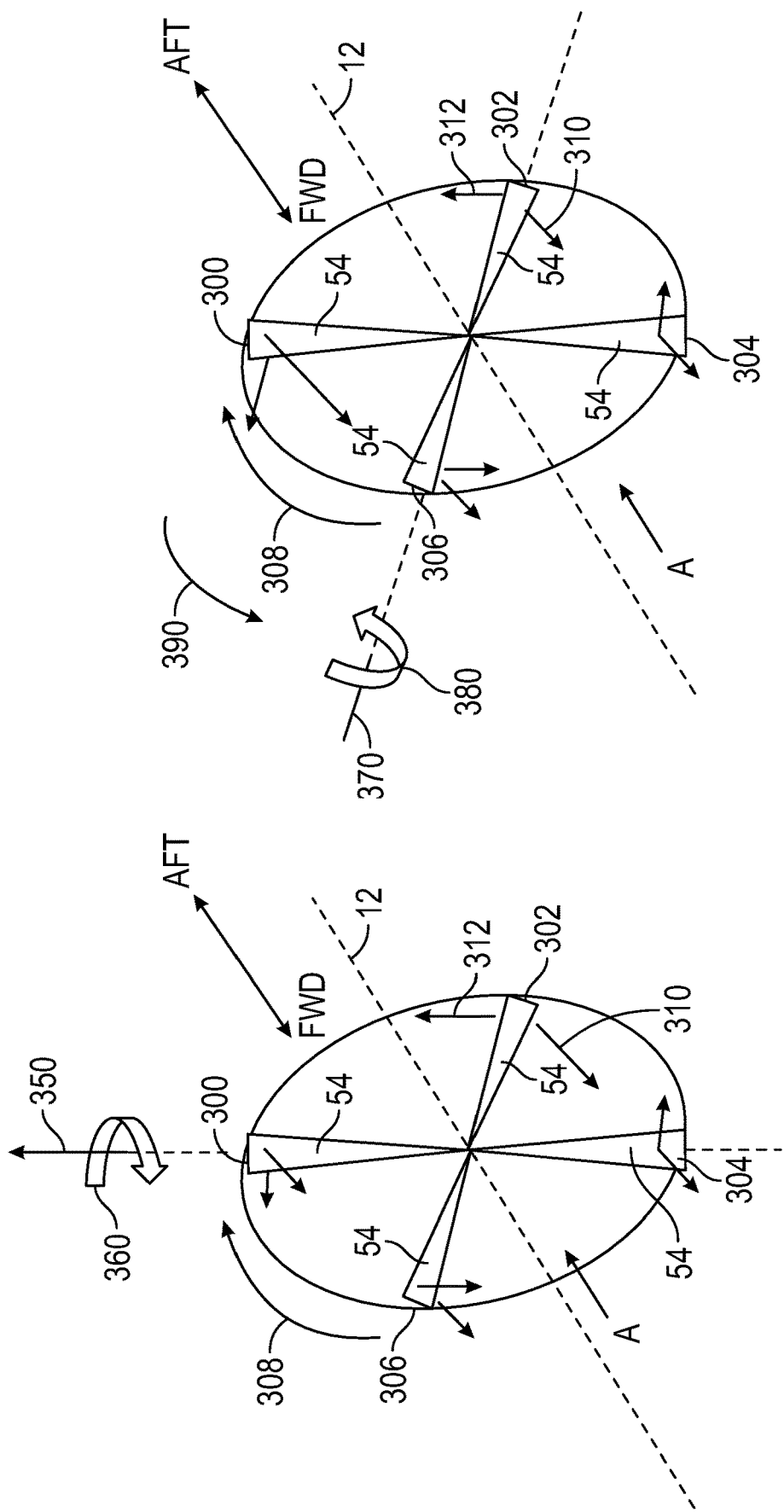
FIG. 3A illustrates a schematic view showing forces of a fan blade, such as the fan blade of the turbine engine shown in FIG. 1, according to the present disclosure.
FIG. 3B illustrates a schematic view showing forces of a fan blade, such as the fan blade of the turbine engine shown in FIG. 1, according to the present disclosure.

Referring briefly to FIGS. 3A and 3B, during operation, the fan blades 54 rotate about the longitudinal centerline axis 12 in the clockwise direction 308 while an airflow A flows from a forward end of the engine toward an aft end of the engine (omitted for clarity). FIGS. 3A and 3B illustrate a single representative fan blade 54 to facilitate understanding of propeller whirl mode. The fan blade 54 rotates three-hundred sixty degrees from a twelve o'clock position 300, to a three o'clock position 302, to a six o'clock position 304, to a nine o'clock position 306, and back to the twelve o'clock position 300. The fan blade 54 is a rotating mass about the longitudinal centerline axis 12, with a restrained end at the base of the fan blade 54. Thus, as the fan blade 54 rotates about the longitudinal centerline axis 12, loads exist at the free end of the fan blade 54 (e.g., nearer to the tip of the fan blade 54 as compared to the restrained base of the fan blade 54) in an axial direction 310 and a vertical direction 312 (e.g., relative to a ground or horizontal reference).

Accordingly, during operation at the 1P frequency (e.g., the base RPM of the fan blades 54), the rotating fan blade 54 encounters two phenomena, depending on the circumferential location of the blade 54, as shown in FIGS. 3A and 3B. In FIG. 3A, the fan blade 54 experiences a shear in a vertical direction 350 and a downward moment that causes the fan blade 54 to yaw (e.g., to twist or to oscillate about the vertical direction 350) right in a yaw direction 360. The vertically directed shear and the right directed yaw result in the fan blades 54 pitching upward. In FIG. 3B, the fan blade 54 also experiences a shear in a lateral direction 370 and a lateral movement that causes the fan blade 54 to pitch downward in a pitch direction 380 (e.g., in the direction opposite of the vertical direction 350 of FIG. 3A). The right directed shear and downward directed pitch result in the fan blades 54 yawing (e.g., twisting or oscillating) to the right. The aforementioned phenomena experienced by the rotating fan blade 54 represent propeller whirl of the fan blade 54. The propeller whirl at the 1P frequency excites backward whirl motion 390 in the fan blade 54. Since the fan blade 54 is restrained at the base of the fan blade 54 (e.g., as shown and described with respect to FIG. 2), the forces pulling on the blade, as previously described, which induce the propeller whirl also result in a change in the holding torque of the fan blade 54 as the structure holding the fan blade 54 in place works to maintain the fan blade 54 at the predetermined pitch angle. Accordingly, the sensor assembly disclosed herein allows for monitoring of the propeller whirl by measuring the amount of torque required to hold the base of the fan blade 54 at the predetermined pitch angle, and any change to that measured torque.

Referring back, FIG. 2 illustrates a sensor assembly 200 associated with the actuator 102 and the second static mounting member 118. The sensor assembly 200 may include one or more sensors. The one or more sensors may include a pressure sensor 202 coupled to the rotating linear actuator 112 and associated with the first chamber 122, a pressure sensor 204 coupled to the rotating linear actuator 112 and associated with the second chamber 124, a strain gauge 206 coupled to the blade pitching lever 110 (also referred to herein as a strain sensor), a conductance band 208 coupled between the second link 106 and the blade pitching lever 110, a load cell 210 coupled to the bearing assembly 114, an accelerometer 212 coupled to the second static mounting member 118, and an accelerometer 214 mounted on the third link 108 coupling the second link 106 to the blade pitching lever 110.

Although the sensor assembly 200 is shown and described as including the aforementioned sensors, any combination or subcombination of the sensors may be present and/or fewer sensors than those shown and described may be present. For example, the sensor assembly 200 may include only one or both pressure sensors (e.g., the pressure sensor 202, which may be a first pressure sensor 202, and/or the pressure sensor 204, which may be a second pressure sensor 204). In another example, the sensor assembly 200 includes only one or both pressure sensors and the strain gauge 206. In another example, the sensor assembly 200 includes only one or both accelerometers (e.g., the accelerometer 212, which may be a first accelerometer 212, and/or the accelerometer 214, which may be a second accelerometer 214). The aforementioned examples are not exhaustive, and any single sensor or combination of sensors described herein may form the sensor assembly 200.

The sensors of the sensor assembly 200 detect various parameters that indicate a blade holding torque. Blade holding torque is the torque required to maintain the desired pitch angle of the fan blade 54. As will be discussed in more detail, the blade holding torque sensed by the sensor assembly 200 correlates to a whirl mode of the fan blades 54. That is, the whirl mode causes variations in the aerodynamic forces on the fan blades 54, which leads to variations of the blade holding torque and variations of the bearing loads.

Referring to FIG. 2, the sensor assembly 200 may include a first pressure sensor 202 and a second pressure sensor 204 to measure a pressure variation in the hydraulic cylinder 120 required to provide a holding torque the fan blades 54. The first pressure sensor 202 and the second pressure sensor 204 are located in the hydraulic cylinder 120 to measure a pressure within the hydraulic cylinder 120. The first pressure sensor 202 is located within the first chamber 122 to detect a pressure variation in the first chamber 122. The second pressure sensor 204 is located within the second chamber 124 to detect a pressure variation in the second chamber 124. The rotating linear actuator 112 includes a single hydraulic cylinder 120, thus, the first pressure sensor 202 and the second pressure sensor 204 provide data related to all of the fan blades 54 combined. The pressure variation measured in the hydraulic cylinder 120 provides the holding torque required for all of the fan blades 54 combined. The first pressure sensor 202 and the second pressure sensor 204 are assembled to the hydraulic cylinder 120 to measure the variation in the cylinder pressure, which provides insight on the variation of the pure torsional load on all of the fan blades 54 combined. The first pressure sensor 202, the second pressure sensor 204, or both the first pressure sensor 202 and the second pressure sensor 204 may be the sole sensor(s) in the sensor assembly 200 or may be provided in conjunction with any one or more of the sensors described herein. Although two pressure sensors are depicted, more or fewer may be provided.

The hydraulic cylinder 120 provides the actuation for the actuator 102 to change the pitch of the fan blades 54. A change in pressure within the hydraulic cylinder 120, when set to a predetermined pitch angle, indicates that the holding torque required to maintain the fan blades 54 at the pitch angle has changed. Thus, a measurement of the change in pressure within one or both chambers (e.g., the first chamber 122 and/or the second chamber 124) of the hydraulic cylinder 120 is an indication of the holding torque required to maintain the actuator 102 and the fan blades 54 at the desired pitch angle. Accordingly, the first pressure sensor 202 and the second pressure sensor 204 measure the holding torque required to maintain all of the fan blades 54 at the desired pitch angle.

With continued reference to FIG. 2, the sensor assembly 200 may include a strain gauge 206 on each blade pitching lever 110. The strain gauge 206 may be located on a circumferential surface of the blade pitching lever 110. The strain gauge 206 measures strain on each blade pitching lever 110 (e.g., at every blade root of the fan blades 54). Thus, each strain gauge 206 provides information related to a respective fan blade 54. The placement of a strain gauge 206 on each blade pitching lever 110 allows an individualized measurement of holding torque for each fan blade 54. The strain gauges 206 may be wireless strain gauges. The strain gauges 206 provide a measurement of strain in the torsional direction, which provides a measurement of torque in the respective fan blade 54. The strain gauges 206 are selected from strain gauges that provide reliable measurements on rotating components. In some examples, redundancy may be added to the sensor assembly 200 by including three sensors one hundred twenty degrees apart on the same blade pitching lever 110 or by including two sensors ninety degrees apart. The strain gauges 206 may be the sole sensors in the sensor assembly 200 or may be provided in conjunction with any one or more of the sensors described herein. Although a single strain gauge 206 on each blade pitching lever 110 is described, more or fewer may be provided.

The blade pitching lever 110, by way of the actuator 102, controls the pitch angle of the respective fan blade 54 (as noted previously, a pitching lever 110 exists for each fan blade 54). Thus, a measurement of the strain in the torsional direction indicates a holding torque to maintain the fan blade 54 at the predetermined pitch angle.

The sensor assembly 200 may include a conductance band 208 between the second link 106 and the blade pitching lever 110. The conductance band 208 measures force variation in the third link 108 connected to the blade pitching lever 110. The conductance band 208 is thus provided at each fan blade 54 to provide information related to a respective fan blade 54. The force variation measured by the conductance band 208 relates to the holding torque for each fan blade 54. The conductance bands 208 may be the sole sensors in the sensor assembly 200 or may be provided in conjunction with any one or more of the sensors described herein. Although a single conductance band 208 coupled to each blade pitching lever 110 is described, more or fewer may be provided.

During pitching of the fan blade 54, the first link 104, the second link 106, and the third link 108 may move axially with the actuator 102 with respect to the blade pitching lever 110. That is, the links 104, 106, and 108 move axially forward and axially aft to control the pitching of the fan blade 54 between the various feather and coarse positions. The conductance band 208 may thus be placed in compression or tension during movement of the second link 106 with respect to the blade pitching lever 110. When the stress (e.g., the compression or tension) in the conductance band 208 changes, the electrical resistance changes and can be detected. The change in electrical resistance, therefore, indicates a change in holding torque.

The sensor assembly 200 may include a load cell 210 at each bearing assembly 114. The load cell 210 is located beneath (e.g., on the surface opposite the raceway surface that contacts the bearing) the outer raceway of the bearing in the bearing assembly 114. The load cell 210 measures radial loads and axial loads at the outer raceway of the bearing assembly 114, which provides an indication of the variation of aerodynamic forces on each fan blade 54. The load cell 210 measures the load (both radial and axial) at the blade root (e.g., the portion of the blade assembly that couples the fan blade 54 to the blade pitching lever 110). The load cells 210 may be located at each blade root of the fan blades 54. Thus, data is collected at all blade locations to provide an indication of whirl mode at each fan blade 54. The load cells 210 may be the sole sensors in the sensor assembly 200 or may be provided in conjunction with any one or more of the sensors described herein. Although a single load cell 210 coupled to each bearing assembly 114 is described, more or fewer may be provided.

As the fan blade 54 rotates about the longitudinal centerline axis 12, there is a variation in the load exerted by the fan blade 54 on the bearing assembly 114. This variation of aerodynamic loads results in a variation in bearing loads on the bearing assembly 114. The load cell 210 measures the variation in bearing loads by measuring a radially pull on the fan blade 54, which is an indication of the holding torque on the fan blade 54.

The sensor assembly 200 may include a first accelerometer 212 and a second accelerometer 214. The first accelerometer 212 and the second accelerometer 214 measure acceleration on the component on which they are located in a specific, predetermined direction. The second accelerometer 214 is located on the third link 108 and the first accelerometer 212 is located on a nonrotating component near the outlet guide vane, such as the second static mounting member 118. The second accelerometer 214 located on the third link 108 detects pure torsional vibrations in each fan blade 54. The first accelerometer 212, the second accelerometer 214, or both the first accelerometer 212 and the second accelerometer 214 may be the sole sensor(s) in the sensor assembly 200 or may be provided in conjunction with any one or more of the sensors described herein. Although two accelerometers are depicted, more or fewer may be provided.

The second accelerometer 214 located on the rotating component measures the frequency of the rotating system. The first accelerometer 212 located on the static component may measure other ambient frequencies generated by the engine 10 and is used to filter out the noise from the frequency signal obtained from the second accelerometer 214.

Accordingly, sensors of the sensor assembly 200 may provide data for all of the fan blades 54 combined (e.g., the pressure sensors) or may provide data for each individual fan blade 54 (e.g., the strain gauge, accelerometer, load cell, and conductance band). The sensor assembly 200 may combine one or more sensors to detect multiple parameters to improve or to enhance, as compared to use of a single sensor, the detection of whirl mode in the gas turbine engine 10 (FIG. 1). In some examples, a sensor that detects a parameter of the combined fan blades 54 may be combined with a sensor that detects a parameter of an individual fan blade 54 to detect whirl mode in the gas turbine engine 10 (FIG. 1). For example, the sensor assembly 200 may include one or more pressure sensors (e.g., one or both of the pressure sensor 202 and the pressure sensor 204) and the strain gauges 206. In this example, the other sensors described herein may be optional and may be omitted. This is only one example and other combinations of sensors are contemplated. The sensor assembly 200 of the present disclosure may include radio frequency identification (RFID), radio waves, short-range wireless technology (e.g., Bluetooth®), near-field communication (NFC), or other wireless communication types. to transmit data from the sensor(s) located on rotating components.

The sensor system 200 communicates with a controller, such as the controller 90 of FIG. 1, to provide detection and monitoring of the presence of propeller whirl and, in some cases, to provide control of the engine to mitigate or reduce the propeller whirl. For example, the controller 90 is configured to receive information and data from the sensors of the sensor system 200. The controller 90 gathers the data and analyzes the data, as discussed in more detail below, to detect and monitor the presence of propeller whirl. The controller 90 may also take an action (e.g., such as a corrective action as described in at step 412 of the method 400 described with respect to FIG. 4).

As the fan blades 54 (FIG. 1) rotate about the longitudinal centerline axis 12, the mass imbalance created by the rotation of the fan blades 54 can result in propeller whirl. When propeller whirl occurs, the fan blades 54 may not be rotating exactly along the longitudinal centerline axis 12 and/or the angle of attack of the fan blade may change. The change of the angle of attack will result in a change or a variation in the holding torque required to maintain the desired pitch angle of the fan blade 54. The sensor assembly 200 measures that holding torque, at the predetermined pitch angle (e.g., as set by the pitching actuator), which can then be used to determine, with the controller 90 (FIG. 1), the presence of propeller whirl. That is, if the system and the method herein detect a change in the holding torque of the blades that is outside of an acceptable range, the system and the method have detected the presence of propeller whirl.

As noted previously, the sensor assembly 200 (e.g., the pressure sensor(s), strain sensor(s), and/or conductance band (s)) measures total holding torque $ht_{total}$ for each fan blade 54. The total holding torque $ht_{total}$ is defined by relationship (1):

$$ht_{total} = ht_{nominal} + ht_{1P} \quad (1)$$

In relationship (1), $ht_{nominal}$ represents nominal holding torque that is determined from rig or lab testing of the engine and $ht_{1P}$ is the holding torque due to the propeller whirls and loads created by the 1P frequency (e.g., due to the loads at the base RPM of the blades 54). The nominal holding torque is the torque required to hold the blade in position during normal engine operation at all flight phases without any abnormal behavior, such as, for example, vibration levels exceeding predetermined limits set by the engine operator. The total holding torque $ht_{total}$ allows for a determination of the holding torque $ht_{1P}$ as shown in relationship (2):

$$ht_{1P} = ht_{total} - ht_{nominal} \quad (2)$$

Likewise, the sensor assembly 200 (e.g., the load cell(s)) measures total bearing loads $Rad_{total}$ for each fan blade 54. The total radial load at the bearing outer raceway $Rad_{total}$ is defined by relationship (3):

$$Rad_{total} = Rad_{nominal} + Rad_{1P} \quad (3)$$

In relationship (3), $Rad_{nominal}$ represents normal radial loads experienced at the bearing during normal operation and is determined from rig or lab testing of the engine and $Rad_{1P}$ is the radial loads due to propeller whirl and 1P loading. The bearing load $Rad_{total}$ allows for a determination of the bearing load $Rad_{1P}$ as shown in relationship (4):

$$Rad_{1P} = Rad_{total} - Rad_{nominal} \quad (4)$$

Figure 4:
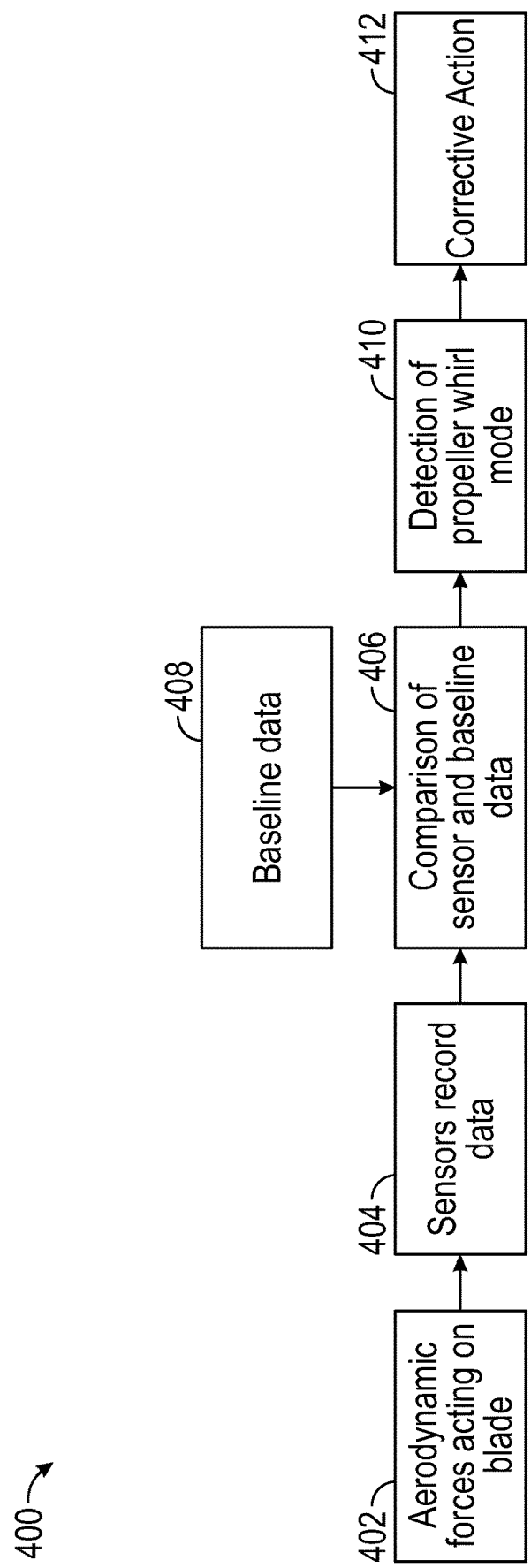
FIG. 4 illustrates a method of detecting whirl of a fan blade, such as the fan blade of the turbine engine shown in FIG. 1, according to the present disclosure.

Referring to FIG. 4, the controller 90 (FIG. 1), is programmed to carry out a method 400 to detect a whirl mode of fan blades 54 in the gas turbine engine 10 including the sensor assembly 200 and to take a corrective action when the whirl mode is detected. At step 402, the fan blades 54 are placed in operation (e.g., rotation begins), and aerodynamic forces act on each fan blade 54, as described previously. The sensors of the sensor assembly 200 detect and record data at step 404. The sensors may record pure torsion vibrations along the fan blade pitch axis and/or varying loads at the bearing location, as described herein. This may be achieved with any combination of the sensors described herein. The sensors detect and record this data at 1P frequency (e.g., the base RPM of the blades 54). The sensors transmit the data to the controller, where the data may be analyzed and stored. At step 406, the measured data is compared, with the controller, to baseline data 408 obtained from rig testing. The comparison may lead to a detection of propeller whirl mode at step 410. The detection of propeller whirl mode at step 410 can (1) signal instability if there is a continuous increase in signal amplitude above a predetermined acceptable range, (2) signal the presence of propeller whirl mode if the signal is outside of the predetermined acceptable range, or (3) signal no instability if the signal amplitude is within the predetermined acceptable range.

After a propeller whirl mode is detected at step 410 and, if appropriate, the controller may initiate a corrective action or a remedial action may be taken at step 412 to reduce or to eliminate the propeller whirl. For example, if the propeller whirl mode is detected to be outside of a predetermined range or a predetermined limit, a corrective action at step 412 may be taken. If the propeller whirl mode is detected at step 410 to be an acceptable value (e.g., within an acceptable predetermined range or below an acceptable predetermined limit), no action needs to be taken.

An exemplary corrective action taken at step 412 may be pitch control of the fan blades (e.g., fan blades 54 described with respect to FIG. 1) with the pitch actuator 102 (FIG. 2). The pitch control may be micro-pitching of the fan blades at a specific frequency to cancel out the variation of aerodynamic forces due to propeller whirl. The micro-pitching is achieved by providing a pulsating blade holding torque to the blades. In an example, the micro-pitching of each blade may be controlled independently with respect to each of the remaining blades. In an example, all of the blades are controlled and each blade is controlled independently of the remaining blades.

Micro-pitching refers to varying the pitch angle of the blade. Micro-pitching can mitigate or reduce propeller whirl by varying the blade pitch angle to obtain a rotating load vector on the blade to suppress the propeller whirl. The amount of the variation in the pitch angle (e.g., the amount of micro-pitching) depends on the magnitude of the rotating load vector to be created to suppress the propeller whirl. The amount may be determined by the controller. In some examples, micro-pitching of the angle includes varying the pitch angle less than 0.5 degrees. The frequency of the micro-pitching is at the 1P frequency. The micro-pitching is performed until the propeller whirl is mitigated (e.g., the values are within a predetermined acceptable range or below a predetermined threshold level) provided that there is no increase in the vibrations from the existing level due to the micro-pitching. Accordingly, monitoring of the propeller whirl continues during the micro-pitching, such that the micro-pitching may be altered to further mitigate propeller whirl or stopped when propeller whirl is no longer detected. The monitoring involves repeatedly detecting the holding torque of all of the plurality of fan blades and of each individual fan blade and determining if the holding torque is indicative of propeller whirl. The monitoring is conducted by the controller (e.g., controller 90 of FIG. 1).

Figure 5:
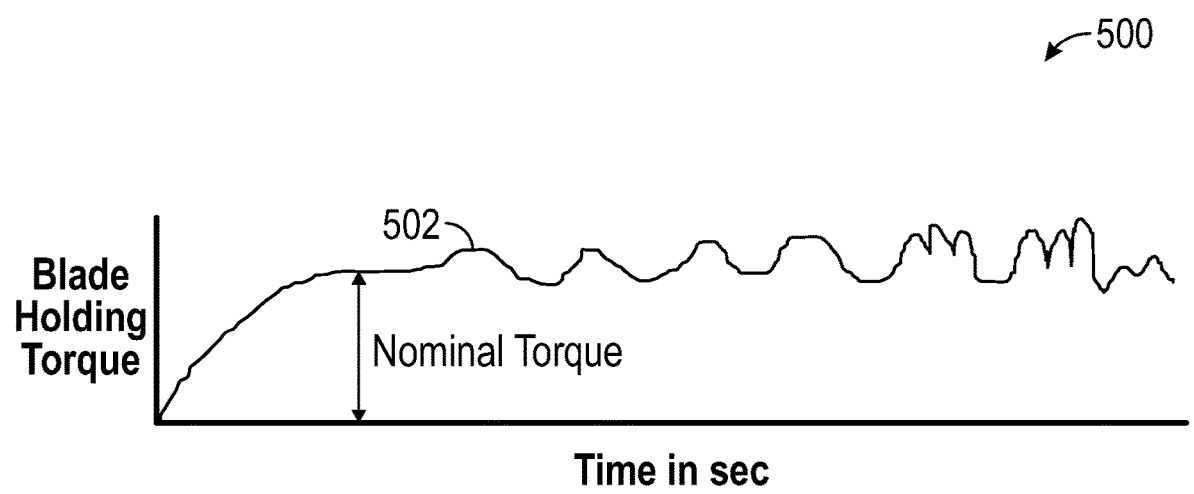
FIG. 5 illustrates a graph of blade holding torque as a function of time, according to the present disclosure.

As noted previously, propeller whirl creates variation in aerodynamic forces on the blades that also results in variation in the blade holding torque. Referring to FIG. 5, the graph 500 depicts blade holding torque as a function of time. As can be seen, there is a nominal torque that represents the required blade holding torque. During engine operation, the blade holding torque 502 may deviate from the nominal torque. As can be seen, there is variation in the blade holding torque 502 due to the varying aerodynamic forces. The variation shown in the graph 500 represents the varying aerodynamic forces associated with propeller whirl.

To remediate the propeller whirl, the fan blades may be micro-pitched. Micro-pitching involves slightly varying (e.g., by less than 0.5 degrees) the pitch angle of each fan blade independently of the other fan blades at a predetermined frequency and a predetermined phase in order to cancel out the varying aerodynamic forces acting on the fan blade caused due to the presence of propeller whirl. The pitch angle is the angle of the fan blade with respect to a longitudinal pitch axis of the fan blade. The predetermined frequency and the predetermined phase may be set to the values that correlate to 1P loading and/or may be determined from rig testing.

Micro-pitching may also be employed to create a rotating load vector (either a radial load vector and/or a thrust load vector) on the fan blade such that the rotating load vector cancels out minor rotating unbalance loads in the fan blades, which may mitigate propeller whirl by forcing the loads closer to theoretical centre of rotation.

Figure 6:
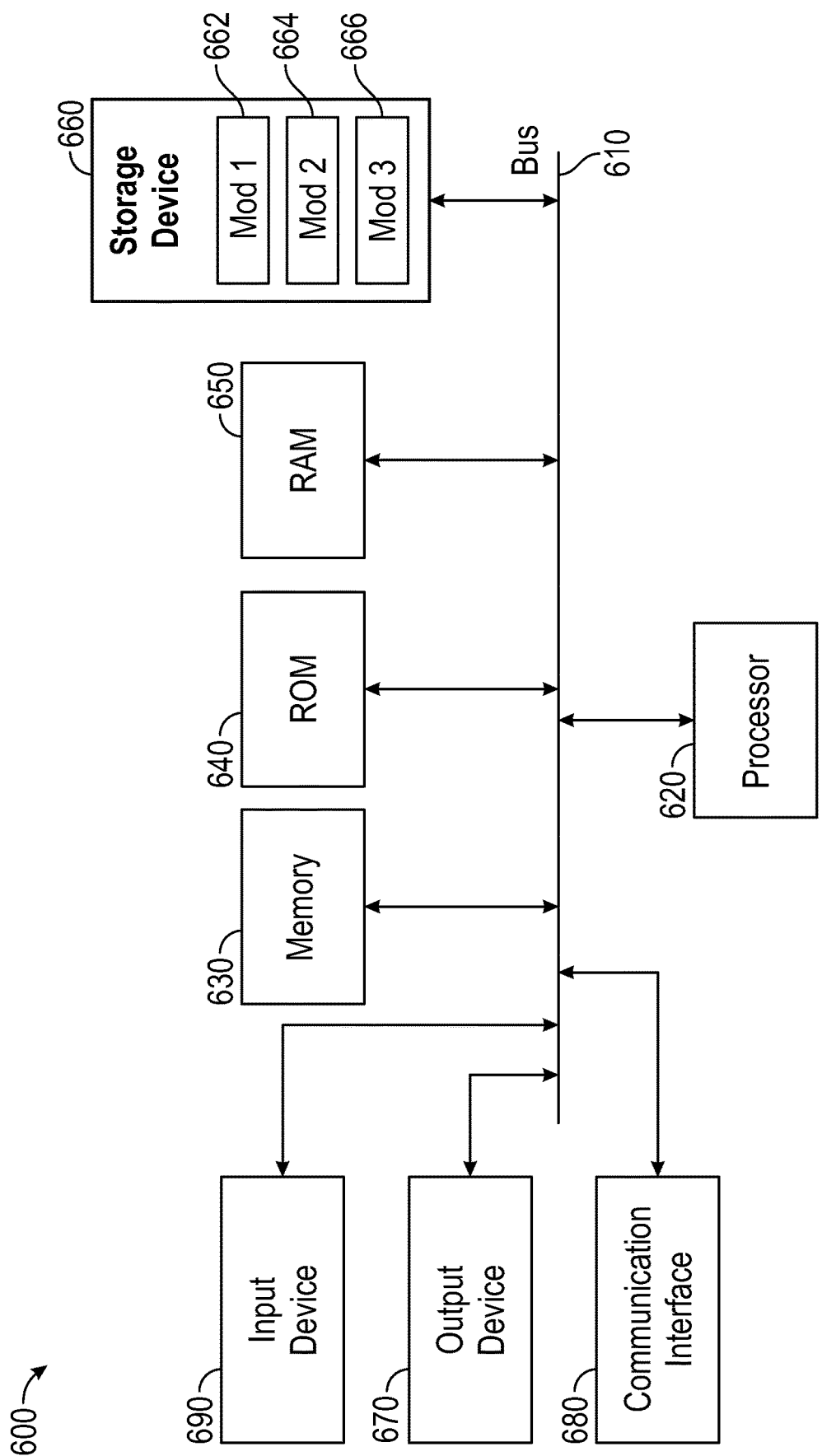
FIG. 6 illustrates an exemplary system for carrying out the method of FIG. 4, according to the present disclosure.

FIG. 6 illustrates an exemplary system for implementing the method 400 with the controller 90 (FIG. 1). The controller 90 may implement steps 406, 410, and 412 of the method 400. The system includes a general-purpose computing device 600 including a processing unit (CPU or processor) 620 and a system bus 610 that couples various system components including the system memory 630 such as read-only memory (ROM) 640 and random-access memory (RAM) 650 to the processor 620. The system can include a cache of high-speed memory connected directly with, in close proximity to, or integrated as part of the processor 620. The system copies data from the system memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The system memory 630 can include multiple different types of memory with different performance characteristics. The disclosure may operate on a computing device 600 with more than one processor 620 or on a group or a cluster of computing devices networked together to provide greater processing capability. The processor 620 can include any general-purpose processor and a hardware module or a software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, a memory controller, a cache, etc.

The system bus 610 may be any of several types of bus structures including a memory bus or a memory controller, a peripheral bus, and a local bus using any of a variety of bus architectures. A basic input/output (BIOS) stored in ROM 640, or the like, may provide the basic routine that helps to transfer information between elements within the computing device 600, such as during start-up. The computing device 600 further includes storage devices 660 such as a hard disk drive, a magnetic disk drive, an optical disk drive, a tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, the system bus 610, the display 670, and so forth, to carry out the function. In another aspect, the system can use a processor and a computer-readable storage medium to store instructions that when executed by a processor (e.g., one or more processors), cause the processor to perform a method or other specific actions. The basic components and appropriate variations are contemplated depending on the type of device, such as whether the computing device 600 is a small, handheld computing device, a desktop computer, or a computer server.

Although the exemplary embodiment described herein employs the hard disk or storage device 660, other types of computer-readable media that can store data that are accessible by a computer, such as magnetic cassettes, flash memory cards, digital versatile disks, cartridges, random-access memories (RAMs) 650, and a read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, a keyboard, a mouse, motion input, speech and so forth. An output device or a display 670 can also be one or more of a number of output mechanisms known to those of skill in the art. In some instances, multimodal systems enable a user to provide multiple types of input to communicate with the computing device 600. The communications interface 680 generally governs and manages the user input and the system output. There is no restriction on operating on any particular hardware arrangement and, therefore, the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Accordingly, the sensor assembly of the present disclosure detects propeller whirl. As discussed, blade holding torque is directly correlated to whirl mode. That is, propeller whirl mode causes variations in the aerodynamic forces on the fan blades 54, as described previously, which leads to variations of blade holding torque and variation of bearing loads. Thus, a measurement of the blade holding torque (provided by the sensor assembly disclosed herein) provides a detection of propeller whirl mode. Stated another way, the sensor assembly 200 of the present disclosure detects propeller whirl by way of a detection of the variation of the blade holding torque (the torque required to maintain a desired pitch angle of the fan blade). By placing the sensors in locations that can detect the blade holding torque, the sensed data can be correlated to detect propeller whirl since the variation of holding torque at 1P frequency (e.g., the base rpm of the blades) is a direct measure of variation of aerodynamic forces on the blade. The detecting described herein can be performed at a rig testing level to predict normal operation versus instability, or an imbalance in the field.

Further aspects are provided by the subject matter of the following clauses.

A turbine engine includes a plurality of fan blades configured to rotate about a longitudinal centerline axis of the turbine engine, a pitch actuator configured to control a pitch angle of each of the plurality of fan blades, a sensor assembly configured to detect a holding torque of the plurality of fan blades, wherein the holding torque represents an amount of torque required to hold each fan blade of the plurality of fan blades at a predetermined pitch angle, and a controller configured to monitor propeller whirl in the plurality of fan blades by detecting the holding torque. The sensor assembly includes a first sensor coupled to the pitch actuator and configured to detect the holding torque of all of the plurality of fan blades and a second sensor coupled to the pitch actuator and configured to detect the holding torque of at least one fan blade of the plurality of fan blades. The pitch actuator is configured to take a corrective action when propeller whirl is detected outside of a predetermined limit.

The turbine engine of the preceding clause, wherein the first sensor is a pressure sensor and the second sensor is one or more of a strain gauge, a conductance band, a load cell, or an accelerometer.

The turbine engine of any preceding clause, further including a third sensor that is one or more of a conductance band, a load cell, or an accelerometer.

The turbine engine of any preceding clause, wherein the pitch actuator is configured to micro-pitch the plurality of fan blades as the corrective action.

The turbine engine of any preceding clause, the pitch actuator including a hydraulic cylinder, and the first sensor is a pressure sensor configured to detect a change in pressure in the hydraulic cylinder of the pitch actuator.

The turbine engine of any preceding clause, the pressure sensor being a first pressure sensor and a second pressure sensor, and the first pressure sensor being coupled to a first chamber of the hydraulic cylinder and the second pressure sensor is coupled to a second chamber of the hydraulic cylinder.

The turbine engine of any preceding clause, the second sensor being a strain gauge.

The turbine engine of any preceding clause, the strain gauge being coupled to a blade pitching lever coupled to the at least one fan blade.

The turbine engine of any preceding clause, the strain gauge being a plurality of strain gauges, each strain gauge coupled to a respective blade pitching lever coupled to a respective fan blade of the plurality of fan blades, and each strain gauge being configured to detect a strain in the respective fan blade.

The turbine engine of any preceding clause, the second sensor being a conductance band.

The turbine engine of any preceding clause, the pitch actuator further including a link and a blade pitching lever coupled to each fan blade of the plurality of fan blades, the conductance band being coupled between at least one blade pitching lever and at least one link of a respective fan blade.

The turbine engine of any preceding clause, the pitch actuator further including a link and a blade pitching lever coupled to each fan blade of the plurality of fan blades, the conductance band being a plurality of conductance bands, each conductance band coupled between the blade pitching lever and the link of a respective fan blade, and each conductance band being configured to detect a change in electrical resistance associated with the respective fan blade.

The turbine engine of any preceding clause, the second sensor being a load cell.

The turbine engine of any preceding clause, the load cell being a plurality of load cells, each load cell coupled to a respective fan blade of the plurality of fan blades, and each load cell being configured to detect a change in bearing load of the respective fan blade.

The turbine engine of any preceding clause, the load cell being coupled to a root of the at least one fan blade.

The turbine engine of any preceding clause, the load cell being coupled to an outer race of a bearing assembly of the fan blade.

The turbine engine of any preceding clause, the second sensor being an accelerometer.

The turbine engine of any preceding clause, the accelerometer being coupled to a rotating component in the turbine engine.

The turbine engine of any preceding clause, the rotating component being a link of the pitch actuator.

The turbine engine of any preceding clause, the accelerometer being a plurality of accelerometers, each accelerometer coupled to a respective rotating component coupled to a respective fan blade of the plurality of fan blades, and each accelerometer being configured to detect a frequency of the respective rotating component.

The turbine engine of any preceding clause, the accelerometer being a first accelerometer, the turbine engine further including a second accelerometer coupled to a static component of the turbine engine, the second accelerometer configured to detect ambient frequencies of the turbine engine to be filtered from a signal generated by the first accelerometer.

The turbine engine of any preceding clause, the first sensor being pressure sensor and the second sensor is one or more of a strain gauge, a conductance band, a load cell, or an accelerometer.

The turbine engine of any preceding clause, further including a third sensor that is one or more of a conductance band, a load cell, or an accelerometer, and the second sensor being a strain gauge.

The turbine engine of any preceding clause, the first sensor being a pressure sensor.

The turbine engine of any preceding clause, further including a third sensor that is one or more of a strain gauge, a load cell, or an accelerometer, and the second sensor being a conductance band.

The turbine engine of any preceding clause, further including a third sensor that is one or more of a strain gauge, a conductance band, or an accelerometer, and the second sensor being a load cell.

The turbine engine of any preceding clause, further including a third sensor that is one or more of a strain gauge, a load cell, or a conductance band, and the second sensor being an accelerometer.

The turbine engine of any preceding clause, further including a conductance band, a load cell, and an accelerometer, and the second sensor being a strain gauge.

The turbine engine of any preceding clause, wherein the pitch actuator is configured to micro-pitch the plurality of fan blades as the corrective action.

A sensor assembly for detecting propeller whirl in a fan blade, the sensor assembly including one or more of a pressure sensor configured to detect a holding torque of a fan blade, a strain gauge configured to detect the holding torque of the fan blade, a conductance band configured to detect the holding torque of the fan blade, an accelerometer configured to detect the holding torque of the fan blade, or a load cell configured to detect the holding torque of the fan blade, the pressure sensor, the strain gauge, the conductance band, the load cell, and the accelerometer being each coupled to a pitch actuator of the fan blade.

A sensor assembly for detecting propeller whirl in a fan blade, the sensor assembly including two or more of a pressure sensor configured to detect a holding torque of a fan blade, a strain gauge configured to detect the holding torque of the fan blade, a conductance band configured to detect the holding torque of the fan blade, an accelerometer configured to detect the holding torque of the fan blade, or a load cell configured to detect the holding torque of the fan blade, the pressure sensor, the strain gauge, the conductance band, the load cell, and the accelerometer being each coupled to a pitch actuator of the fan blade.

A method of detecting propeller whirl of a fan blade, the method including controlling the fan blade to a predetermined pitch angle, rotating the fan blade in a circumferential direction, detecting, with a sensor, a holding torque required to maintain the fan blade in a circumferential direction, comparing the holding torque with a baseline data associated with the fan blade, detecting propeller whirl of the fan blade based on the comparing, and taking corrective action to mitigate the propeller whirl.

The method of the preceding clause, propeller whirl being detected when the holding torque is outside of a predetermined range.

The method of any preceding clause, propeller whirl being not detected when the holding torque is within a predetermined range.

The method of any preceding clause, detecting the holding torque including sensing a change in pressure in a pitch actuator configured to provide the predetermined pitch angle.

The method of any preceding clause, detecting the holding torque including sensing a strain in a pitch actuator configured to provide the predetermined pitch angle.

The method of any preceding clause, detecting the holding torque including sensing a change in a conductance band of a pitch actuator configured to provide the predetermined pitch angle.

The method of any preceding clause, detecting the holding torque including sensing a frequency in a rotating member of a pitch actuator configured to provide the predetermined pitch angle.

The method of any preceding clause, further including removing noise from a signal generated from the sensing.

The method of any preceding clause, the fan blade being a plurality of fan blades.

The method of the preceding clause, the sensing including sensing a holding torque of each of the fan blades individually and sensing a holding torque of all of the plurality of fan blades together.

The method of any preceding clause, detecting the holding torque including sensing a total holding torque with the sensor, and determining a holding torque due to propeller whirl by removing a nominal holding torque from the total holding torque.

The method of any preceding clause, further including measuring a total bearing load on a bearing assembly supporting the fan blade, and determining a loading on the bearing assembly due to propeller whirl by removing a normal bearing load from the total bearing load.

The method of any preceding clause, further including micro-pitching the fan blade to cancel out the holding torque associate with propeller whirl.

A method of detecting propeller whirl in the engine of any preceding clause.

A method of detecting propeller whirl with a sensor assembly of any preceding clause.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbine engine comprising:
   a plurality of fan blades configured to rotate about a longitudinal centerline axis of the turbine engine;
   a pitch actuator configured to control a pitch angle of each of the plurality of fan blades;
   a sensor assembly configured to detect a holding torque of the plurality of fan blades, wherein the holding torque represents an amount of torque required to hold each fan blade of the plurality of fan blades at a predetermined pitch angle, the sensor assembly including:
- a first sensor coupled to the pitch actuator and configured to detect the holding torque of all of the plurality of fan blades; and
- a second sensor coupled to the pitch actuator and configured to detect the holding torque of at least one fan blade of the plurality of fan blades; and a controller configured to monitor propeller whirl in the plurality of fan blades by detecting the holding torque, wherein the pitch actuator is configured to take a corrective action when propeller whirl is detected outside of a predetermined limit.

2. The turbine engine of claim 1, wherein the first sensor is a pressure sensor and the second sensor is one or more of a strain gauge, a conductance band, a load cell, or an accelerometer.

3. The turbine engine of claim 1, wherein the pitch actuator is configured to micro-pitch the plurality of fan blades as the corrective action.

4. The turbine engine of claim 1, wherein the pitch actuator includes a hydraulic cylinder, and the first sensor is a pressure sensor configured to detect a change in pressure in the hydraulic cylinder of the pitch actuator.

5. The turbine engine of claim 4, wherein the pressure sensor is a first pressure sensor and a second pressure sensor, and wherein the first pressure sensor is coupled to a first chamber of the hydraulic cylinder and the second pressure sensor is coupled to a second chamber of the hydraulic cylinder.

6. The turbine engine of claim 1, wherein the second sensor is a strain gauge.

7. The turbine engine of claim 6, wherein the strain gauge is coupled to a blade pitching lever coupled to the at least one fan blade.

8. The turbine engine of claim 7, wherein the strain gauge is a plurality of strain gauges, each strain gauge coupled to a respective blade pitching lever coupled to a respective fan blade of the plurality of fan blades, and wherein each strain gauge is configured to detect a strain in the respective fan blade.

9. The turbine engine of claim 1, wherein the second sensor is a conductance band.

10. The turbine engine of claim 9, the pitch actuator further including a link and a blade pitching lever coupled to each fan blade of the plurality of fan blades, wherein the conductance band is coupled between at least one blade pitching lever and at least one link of a respective fan blade.

11. The turbine engine of claim 9, the pitch actuator further including a link and a blade pitching lever coupled to each fan blade of the plurality of fan blades, wherein the conductance band is a plurality of conductance bands, each conductance band coupled between the blade pitching lever and the link of a respective fan blade, and wherein each conductance band is configured to detect a change in electrical resistance associated with the respective fan blade.

12. The turbine engine of claim 1, wherein the second sensor is a load cell.

13. The turbine engine of claim 12, wherein the load cell is a plurality of load cells, each load cell coupled to a respective fan blade of the plurality of fan blades, and wherein each load cell is configured to detect a change in bearing load of the respective fan blade.

14. The turbine engine of claim 12, wherein the load cell is coupled to a root of the at least one fan blade.

15. The turbine engine of claim 14, wherein the load cell is coupled to an outer raceway of a bearing assembly of the at least one fan blade.

16. The turbine engine of claim 1, wherein the second sensor is an accelerometer.

17. The turbine engine of claim 16, wherein the accelerometer is coupled to a rotating component in the turbine engine.

18. The turbine engine of claim 17, wherein the rotating component is a link of the pitch actuator.

19. The turbine engine of claim 17, wherein the accelerometer is a plurality of accelerometers, each accelerometer coupled to a respective rotating component coupled to a respective fan blade of the plurality of fan blades, and wherein each accelerometer is configured to detect a frequency of the respective rotating component.

20. The turbine engine of claim 17, wherein the accelerometer is a first accelerometer, the turbine engine further including a second accelerometer coupled to a static component of the turbine engine, the second accelerometer configured to detect ambient frequencies of the turbine engine to be filtered from a signal generated by the first accelerometer.

* * * * *